Figure 1:
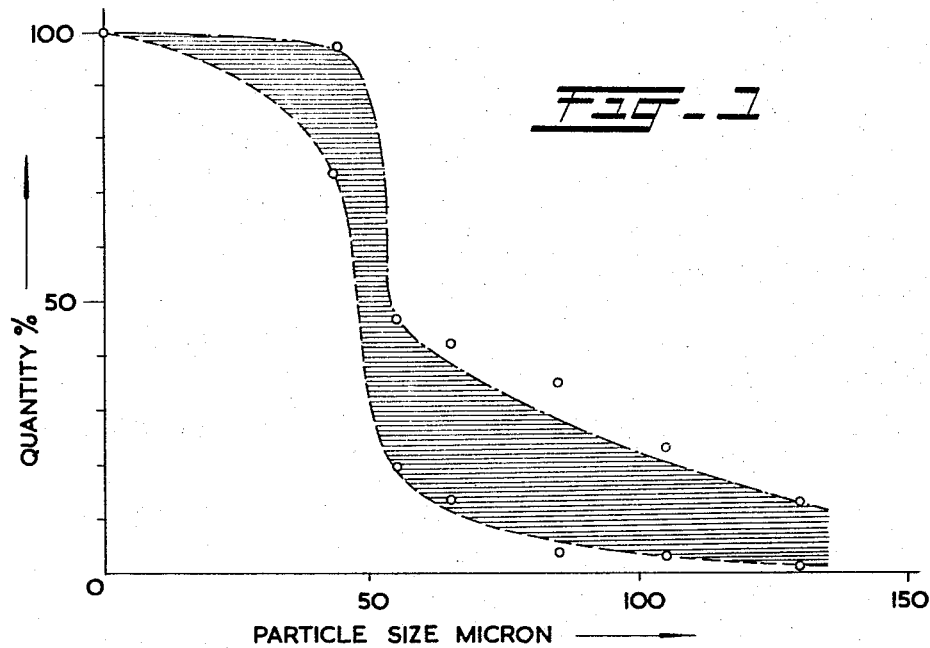

United States Patent Office 3,318,536
Patented May 9, 1967

3,318,536
PROCESS FOR FINELY GRINDING MEAL OF WHEAT, RYE AND SIMILAR GRANULAR FRUITS OR CEREALS
Hermann Graumann, 45 Kennemerstraatweg, Heiloo, Netherlands
Filed May 27, 1964, Ser. No. 370,510
Claims priority, application Netherlands, May 27, 1963, 293,254
1 Claim. (Cl. 241—6)

The invention relates to a process for finely grinding meal of wheat, rye, or similar granular fruits or cereals.

The meal obtained in the ordinary wheat and rye milling industry has a distribution of grain size the upper limit of which is about at 150 to 200 microns, while the lower limit may be as low as 1 micron. Dependent upon the physical properties of the starting product and upon the milling method, as a rule about 90 to 98% of the meal is produced in the size range of about 150 to 45 microns.

This main fraction as well as any portion having a grain size exceeding 150 microns consists substantially of endosperm cells and fragments thereof, i.e., of protein-embedded grains of starch.

The fraction having a size between about 45 and 20 to 15 microns, which forms about 5% of the total amount, also contains fragments of endosperm cells, but is characterized in particular by a high content of liberated grains of starch.

The remaining meal, which also forms about up to 5% of the total amount and has a grain size below 20 to 15 microns, contains, in addition to the smallest grains of starch, which may often be damaged more or less seriously dependent upon the starting product and upon the milling method, substantially protein, since in view of its relatively small cohesion this is comminuted more readily than the starch, which owing to its considerably greater cohesion offers much greater resistance to milling. The fraction having a grain size between about 45 and 20 to 15 microns thus on the whole is produced with a low protein content, whereas the finest fraction, having a grain size below about 20 to 15 microns, shows a more or less considerable protein enrichment.

In connection with these diverging compositions of the various fractions, these fractions also have different properties, which greatly affect the suitability of these fractions for the various applications. The reduction of the particle size of the meal leads in particular to a higher water-absorption capacity and dough output, and moreover, when the starch is damaged, to a further increase of the water-absorption and a greater evolution of gas and/or formation of carbon dioxide gas.

These properties characteristic for the finer fractions of the meal having a grain size below about 45 microns on the whole are found not very suitable, for instance, for the preparation of bread, but are particularly suitable for other applications, such as the fraction poor in protein for the production of gingerbread and biscuits, and the fraction rich in protein for the production of rusks, and consequently a reduction of the distribution of the grain size of the normally used meal appears to be effective for these applications. With a view to these different applications of the cereal meals in the baking industry the problem of their further comminution, which is sometimes referred to as finest milling or second milling, may thus in a sense be characterized as the separation of their coarser fraction, of the endosperm cells, and of their fragments, into their constituents starch and protein, the starch having to remain as much as possible undamaged. As appears from the above, the physical properties of the starch and of the protein, which affect their comminution, meet this desirability to a considerable degree.

In order to achieve the reduction of the grain size of the coarser fraction, several methods and appliances have been developed and applied, such as the different variants of the impact and air-jet mills. In these mills the material is comminuted by causing the particles to impinge against a hard surface or against each other, the kinetic energy of the relative motion of the first impact phase being converted more or less completely into comminution work. The impact velocities which are employed in these mills for the finest grinding of meal are, dependent upon the physical properties of the material, about 80 to 120 m./sec. in impact mills and up to 500 m./sec. in air-jet mills. All these mills therefore have a disproportionately high specific energy consumption, which in the present case is about 30–40 kwh./ton and higher for impact mills and far above 100 kwh./ton for air-jet mills, dependent upon the composition and properties of the starting product and the desired degree of fineness.

On the basis of the circumstance that the cohesion of the protein constituents of the endosperm is relatively small as compared with that of the grains of starch, certain experiments have shown that this finest or second grinding of meal can be effected with only a very low energy consumption of up to about 5 kwh./ton in one passage in roller mills in which the rollers are polished and have a hard surface, preferably of steel or Hartguss (hard white cast iron) of ultra-fine structure, and rotating with the same peripheral speed. The comminution of the endosperm cells and of their fragments having a grain size of approximately above 45 microns in this way is therefore achieved exclusively by pressure, which only eliminates the cohesion of the protein, and partly its adhesion to the starch cells, without further secondary effects of any kind, and which leaves the grains of starch undamaged to a high degree.

The following Table I and the annexed FIGURE 1 show the result of such a second grinding on rollers of a meal ground in the conventional way. In this figure, 1 is the fineness characteristic of the meal resulting from the normal grinding process, while 2 is the same characteristic of the same meal after a second grinding according to the invention, based on the values given in Table I.

TABLE I

| Particle size, microns | Meal from normal grinding | | Meal from second grinding according to the invention | |
|---|---|---|---|---|
| | Percent | Total percent | Percent | Total percent |
| Below— | | | | |
| 44 | 2.5 | 2.5 | 26.8 | 26.8 |
| 44–55 | 50.5 | 53.0 | 53.7 | 80.5 |
| 55–65 | 5.0 | 58.0 | 6.0 | 86.5 |
| 65–85 | 7.0 | 65.0 | 10.0 | 96.5 |
| 85–105 | 12.0 | 77.0 | 0.5 | 97.0 |
| 105–130 | 10.0 | 87.0 | 2.0 | 99.0 |
| Above 130 | 13.0 | 100.0 | 1.0 | 100.0 |

Figure 2:
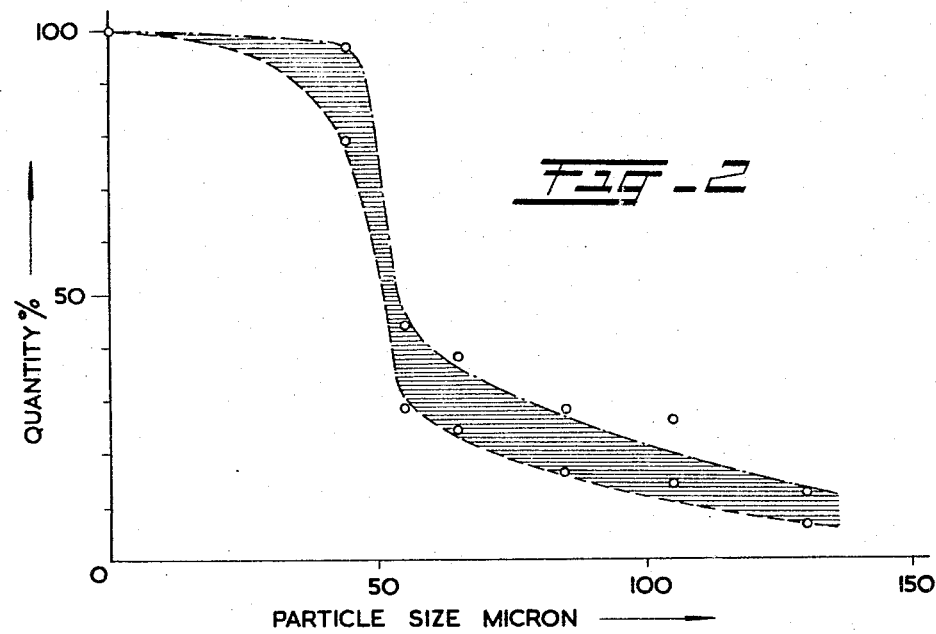

Table II and FIG. 2, for purposes of comparison, give the result of the second grinding of another meal, ground to the same degree of fineness, in an impact mill. In FIG. 2 the numeral 1 again indicates the characteristic of a meal resulting from the normal grinding process, and 2 indicates the characteristic of the same meal after a known second grinding in an impact mill, all this on the basis of the values given in Table II.

TABLE II

| Particle size, microns | Meal from normal grinding | | Meal from the impact mill | |
|---|---|---|---|---|
| | Percent | Total percent | Percent | Total percent |
| Below— | | | | |
| 44 | 3.0 | 3.0 | 20.6 | 20.6 |
| 44–55 | 52.6 | 55.6 | 51.0 | 71.6 |
| 55–65 | 6.0 | 61.6 | 4.0 | 75.6 |
| 65–85 | 10.0 | 71.6 | 8.0 | 83.6 |
| 85–105 | 2.0 | 73.6 | 2.0 | 85.6 |
| 105–130 | 14.0 | 87.6 | 8.0 | 93.6 |
| Above 130 | 12.4 | 100.0 | 6.4 | 100.0 |

From the graphs in FIGS. 1 and 2 it is also clear that the useful comminution work, represented by the shaded surface between the two characteristics, is considerably more in the second grinding according to the invention than it is in the second grinding in an impact mill.

The degree of damage to the starch, which is expressed by the amount of amylose produced in mg. per 100 g. of meal and which is briefly referred to as amylose value, was 520 for the starting material of Table I after the normal grinding process and 795 after the second grinding, while these amylose values rose to 1200 and upwards after grinding in impact and air-jet mills.

What I claim is:

A process for finely comminuting meal consisting substantially of protein-embedded grains of starch having a particle size greater than about 45 microns which comprises passing the meal between a pair of highly polished smooth rollers which have a hard surface of ultrafine grain structure and which rotate under pressure at the same peripheral speed, wherein the overall particle size of the meal is reduced by liberating the protein from the starch grains without substantial damage to the grains.

References Cited by the Examiner

UNITED STATES PATENTS 1,136,501   5/1915   Andrews _____ 241—6 XR

WILLIAM W. DYER, JR., *Primary Examiner.*

H. F. PEPPER, *Assistant Examiner.*